United States Patent
Espelien

(10) Patent No.: US 7,493,106 B2
(45) Date of Patent: Feb. 17, 2009

(54) SYSTEM AND METHOD FOR DELIVERING MEDIA CONTENT BASED ON A SUBSCRIPTION

(75) Inventor: Joel Espelien, San Diego, CA (US)

(73) Assignee: Packet Video Corp., San Diego, CA (US)

(*) Notice: Subject to any disclaimer, the term of this patent is extended or adjusted under 35 U.S.C. 154(b) by 171 days.

(21) Appl. No.: 11/706,785

(22) Filed: Feb. 14, 2007

(65) Prior Publication Data

US 2007/0220555 A1   Sep. 20, 2007

Related U.S. Application Data

(60) Provisional application No. 60/783,282, filed on Mar. 17, 2006.

(51) Int. Cl.
*H04M 11/10* (2006.01)
(52) U.S. Cl. ............... 455/414.1; 455/414.2; 455/418; 725/37; 707/100; 709/228
(58) Field of Classification Search .......... 455/414.1, 455/414.2, 418; 725/37; 709/228; 707/100
See application file for complete search history.

(56) References Cited

U.S. PATENT DOCUMENTS

| | | | |
|---|---|---|---|
| 6,167,092 A | 12/2000 | Lengwehasatit | |
| 6,498,865 B1 | 12/2002 | Brailean et al. | |
| 6,529,552 B1 | 3/2003 | Tsai et al. | |
| 6,772,178 B2* | 8/2004 | Mandal et al. | 707/204 |
| 7,006,631 B1 | 2/2006 | Luttrell | |
| 7,216,170 B2* | 5/2007 | Ludvig et al. | 709/225 |
| 7,281,035 B2* | 10/2007 | Ihara et al. | 709/219 |
| 2002/0092032 A1* | 7/2002 | Kim | 725/153 |

(Continued)

FOREIGN PATENT DOCUMENTS

WO    WO2007/109115    9/2007

OTHER PUBLICATIONS

PCT Written Opinion, Aug. 22, 2008.

(Continued)

*Primary Examiner*—Danh C Le
(74) *Attorney, Agent, or Firm*—Patents+TMS, P.C.

(57) ABSTRACT

A system and a method deliver media content based on a subscription of a first user to a media provider. The first user accesses and/or consumes the media content from the media provider based on the subscription with one or more terminals at one or more locations. The first user accesses a list of media content available for consumption from the media provider based on the subscription of the first user. The list of media content available is accessed by and displayed to the first user on an electronic program guide via one or more terminals at one or more locations. The first user accesses and consumes a multimedia file from the list of media content available based on the subscription of the first user via one or more terminals at one or more locations. The first user and/or a second user consumes and/or experiences the multimedia file via a terminal of the second user based on the subscription of the first user. The first user stores the list of media content available and/or the multimedia file in the storage device associated with the first user via one or more terminals at one or more locations.

20 Claims, 2 Drawing Sheets

U.S. PATENT DOCUMENTS

| | | |
|---|---|---|
| 2003/0140343 A1* | 7/2003 | Falvo et al. .................... 725/51 |
| 2003/0229900 A1* | 12/2003 | Reisman ....................... 725/87 |
| 2004/0174817 A1 | 9/2004 | Jabri et al. |
| 2006/0013148 A1 | 1/2006 | Burman et al. |
| 2006/0029041 A1 | 2/2006 | Jabri et al. |
| 2006/0031883 A1* | 2/2006 | Ellis et al. .................... 725/58 |
| 2006/0056416 A1 | 3/2006 | Yang et al. |
| 2006/0159037 A1 | 7/2006 | Jabri et al. |
| 2006/0176877 A1 | 8/2006 | Jabri et al. |
| 2007/0093275 A1* | 4/2007 | Bloebaum et al. ........... 455/566 |

OTHER PUBLICATIONS

PCT Search Report, Aug. 22, 2008.

* cited by examiner

SYSTEM AND METHOD FOR DELIVERING MEDIA CONTENT BASED ON A SUBSCRIPTION

This application claims the benefit of U.S. Provisional Application Ser. No.: 60/783,282, filed Mar. 17, 2006.

BACKGROUND OF THE INVENTION

The present invention generally relates to a system and a method for delivering media content based on a subscription. More specifically, the present invention relates to a system and a method for delivering media content based on a subscription of a first user to a media provider. The subscription from the media provider may be associated with and/or may correspond to the first user. A first terminal of the first user may access and/or may identify a list of media content available from the media provider for consumption by the first user based on the subscription of the first user. The list of media content available may be accessed by, may be viewed on and/or may be displayed by an electronic program guide (hereinafter "EPG") of the first user. The first user may identify, may access and/or may consume one or more multimedia files in a database of the media provider from the list of media content available. The first user may store one or more multimedia files from the list of media content available in a storage device of the first user.

Alternatively, the first user may access, may view and/or may display the EPG of the first user with a second terminal of a second user. The second terminal may be connected to the media provider via the network for accessing the list of media content available based on the subscription of the first user. The first user may access and/or may consume one or more of the multimedia files from the list of media content available. As a result, the first user and the second user may view and/or may experience one or more multimedia files. The first user may store one or more multimedia files in the storage device of the first user which may be connectable to the second terminal via the network.

It is generally known, for example, that a user may use an output device to display, to access, to consume and/or to view media programming in a location, such as, for example, a home, a school, a library, a conference room, an office and/or the like. The output device may be, for example, a display, a television, a monitor, a projector and/or the like. The media programming is transmitted by, is accessible from and/or is provided from a content provider for transferring the media programming to a terminal connected to the output device. Typically, the content provider is, for example, a broadcast television station, a cable television station, a satellite television station and/or the like. Further, the terminal is traditionally a set-top receiver which is in communication with and/or is connected to the content provider and the output device. As a result, the location of the terminal is stationary with respect to the content provider. Moreover, the terminal is associated with and/or is provided from the content provider.

The user purchases and/or obtains a subscription from the content provider to access, to obtain, to consume and/or to display the media programming provided by the content provider via the terminal. The subscription from the content provider is associated with, is assigned to and/or corresponds to the terminal of the user. Further, the subscription from the content provider is not associated with, is not assigned to and/or does not correspond to the user of the terminal and/or of the output device. As a result, the location of the terminal which the user may consume and/or may access the media programming is stationary with respect to the content provider.

The subscription from the content provider allows the user to access, to obtain, to consume and/or to display the media programming from the content provider via the output device and the terminal over a network. The network may be a cable network, a location satellite network and/or the like. The user may obtain and/or may identify a list of the media programming which may be accessible and/or may be consumable by the user based on the subscription of the user. The list of the media programming is only accessible on an electronic program guide (EPG) which is viewable and/or is displayed via the output device and the terminal at the location. The list of the media programming available to the terminal is based on the terminal. The user may select a media program from the list of media programming available via the EPG and the terminal.

The user may view, may experience and/or may display the media program via the terminal, the output device and/or the network. However, the media program selected by the user is only viewable and/or is only consumable at the location of the terminal via the output device. Additionally, the user is prevented from and/or is restricted from accessing and/or from consuming, the EPG, the list of the media programming and/or the media program with other terminals which are not associated with the subscription from the content provider. Moreover, the user is prevented from and/or is restricted from accessing and/or from consuming the media programming and/or the media program in other locations which are not associated with and/or are remote with respect to the terminal.

A need, therefore, exists for a system and a method for delivering media content based on a subscription. Additionally, a need exists for a system and a method for delivering media content based on a subscription which may be associated with, may be assigned to and/or may correspond to a user of the subscription. Further, a need exists for a system and a method for delivering media content based on a subscription which may access a list of the media content available based on the subscription via one or more terminals which may be remote with respect to each other. Still further, a need exists for a system and a method for delivering media content based on a subscription which may access an EPG to display the media content available based on the subscription via one or more terminals which may be remote with respect to each other. Moreover, a need exists for a system and a method for delivering media content based on a subscription which may consume a multimedia file based on a user of the subscription via one or more terminals which may be remote with respect to each other. Furthermore, a need exists for a system and/or a method for delivering media content based on a subscription which may store a multimedia file available based on the subscription of a user in a storage device associated with a user of the subscription.

SUMMARY OF THE INVENTION

The present invention generally relates to a system and a method for delivering media content based on a subscription. A first user may have a subscription from a media provider to consume, to access and/or to display the media content from the media provider based on the subscription of the first user. A first terminal of the first user may be connected to and/or may be in communication with the media provider via a network based on the subscription of the first user. A storage device of the first user may be connectable to the first terminal via the network. The storage device may be local or may be remote with respect to the first terminal and/or first user. The first user may identify and/or may access a list of media content available for consumption from the media provider based on the subscription of the first user.

The list of media content available may be displayed and/or may be viewed by the first user on an electronic program guide (EPG) via the first terminal and/or via a second terminal of a second user. The second terminal may be remote with respect to the first terminal. The first user may identify, may access and/or may consume a multimedia file from the list of media content available based on the subscription of the first user via the first terminal and/or the second terminal. The first user and/or the second user may view and/or may experience the multimedia file via the first terminal and/or the second terminal. The first user may store the list of media content available and/or the multimedia file in the storage device from the first terminal and/or from the second terminal.

In an embodiment of the present invention, a system for transmitting multimedia wherein a first user has a first subscription and a second user has a second subscription is provided. The system has a first database connected to a first media provider wherein a first plurality of multimedia files is stored within the first database; a first electronic program guide that lists at least one multimedia file of the first plurality of multimedia files wherein the first electronic program guide corresponds to the first subscription of the first user; and a second database connected to a second media provider wherein a second plurality of multimedia files is stored within the second database. The system has a first network connected to the first media provider and the second media provider. The system has a first terminal associated with the first media provider and connected to the first network wherein the first media provider identifies the first subscription of the first user to allow the first user to use the first terminal to access the first electronic program guide via the first network wherein the first terminal displays the first electronic program guide to the first user wherein the first user selects a first multimedia file of the first plurality of multimedia files from the first electronic program guide so that the first multimedia file is transmitted to the first terminal. The system has a second terminal associated with the second media provider and connected to the first network wherein the first media provider identifies the first subscription of the first user to allow the first user to use the second terminal to access the first electronic program guide wherein the second terminal displays the first electronic program guide to the first user wherein the first user selects a seconds multimedia file of the first plurality of multimedia files from the first electronic program guide so that the second multimedia file is transmitted to the second terminal. The system has a storage device connected to the first network wherein the storage device is associated with the first user by the first subscription of the first user wherein the first multimedia file transmitted to the first terminal and the second multimedia file transmitted to the second terminal is stored in the storage device and accessed by the first user based on the first subscription of the first user.

In an embodiment, the system has a second electronic program guide associated with the second plurality of multimedia files wherein the second user uses the first terminal to access the second electronic program guide via the first network based on the second subscription.

In an embodiment, the system has a second network connected to the first terminal and the first media provider wherein the first terminal accesses the first database via the second network and the first media provider.

In an embodiment, the system has a second database connected to a second media provider wherein a second plurality of media files is stored within the second database.

In an embodiment, the system has a graphic user interface wherein the graphic user interface displays the first electronic program guide and allows the first user to select one or more of the plurality of multimedia files available on the electronic programming guide so that one or more of the plurality of multimedia files are transmitted to the first user via the first network.

In an embodiment, the second terminal is located remotely with respect to the first terminal.

In an embodiment, the first electronic program guide displays a time and a duration associated with each one of the plurality of multimedia files that are displayed.

In an embodiment, the first electronic program guide displays multimedia files that correspond to an interest of the user.

In an embodiment, the first user uses the second terminal to access the storage device via the first network based on the first subscription.

In an embodiment, the system has a third terminal connected to the first terminal wherein a third user accesses the first electronic program guide via the third terminal based on the first subscription of the first user.

In another embodiment, a method is provided for transmitting multimedia to a first user having a first subscription and a second user having a second subscription, the method comprising the steps of: connecting a first media provider to a first network wherein the first media provider has a first database of multimedia files; connecting a second media provider to a first network wherein the second media provider has a second database of multimedia files; connecting a first terminal to the first network wherein the first terminal is associated with the first subscription; connecting a second terminal to the first network wherein the second terminal is associated with the second subscription; connecting a storage device to the first network; providing the first user access to the first database from the first terminal via the first network based on the first subscription of the first user; transmitting a first multimedia file from the first database to the first user at the first terminal based on the first subscription; providing the first user access to the first database from the second terminal via the first network based on the first subscription of the first user; transmitting a second multimedia file from the first database to the first user at the second terminal based on the first subscription; and storing the second multimedia file in the storage device.

In an embodiment, a method is provided for transmitting multimedia further comprising the step of: providing the first user access to an electronic program guide that lists the multimedia files and allows the first user to select the first multimedia file.

In an embodiment, a method is provided for transmitting multimedia further comprising the step of: displaying an electronic program guide that lists multimedia files that correspond to an interest of the first user.

In an embodiment, a method is provided for transmitting multimedia further comprising the step of: connecting a second network to the first terminal wherein the first database is accessible from the first media provider via the second communication network.

In an embodiment, a method is provided for transmitting multimedia further comprising the step of: storing the first multimedia file in the storage device wherein the first multimedia file is accessible by the first user at the second terminal based on the first subscription.

In an embodiment, a method is provided for transmitting multimedia further comprising the step of: accessing the second database from the first terminal via the first network based on the second subscription of the second user.

In another embodiment, a method is provided for transmitting multimedia to a user having a subscription, the method comprising the steps of: connecting a first media provider to a network wherein the first media provider has a first database of multimedia files of: connecting a first terminal and a second terminal to the first network wherein the first terminal is associated with the first subscription and the second terminal is associated with the second subscription; generating a request by the second terminal for a multimedia file content list to be transmitted from the first media provider wherein the request has information about the first subscription of the first user wherein the multimedia file content list is multimedia files accessible by the user under the subscription; transmitting an electronic program guide to the first user at the second terminal via the network wherein the electronic program guide includes the multimedia file content list wherein the electronic program guide is based on the first subscription of the user; and transmitting at least one of the multimedia files from the first database to the second terminal wherein the first media provider delivers the multimedia file via the network to the user for use on the second terminal wherein the multimedia file is selected by the user from the multimedia file content list.

In an embodiment, a method is provided for transmitting multimedia further comprising the step of: the electronic program guide displaying multimedia files that correspond to a preference of the user.

In an embodiment, a method is provided for transmitting multimedia further comprising the step of: a graphic user interface that displays the electronic program guide and allows the user to select the multimedia file from the multimedia file content list.

In an embodiment, a method is provided for transmitting multimedia further comprising the step of: storing the multimedia file in a storage device connected to the network.

It is, therefore, an advantage of the present invention to provide a system and a method for delivering media content based on a subscription.

Another advantage of the present invention is to provide a system and a method for delivering media content based on a subscription which may provide a list of media content available for consumption based on the subscription of a user to a media provider.

And, another advantage of the present invention is to provide a system and a method for delivering media content based on a subscription which may provide a terminal in a first location and/or in a second location for accessing and/or for consuming the media content based on the subscription of a user to a media provider.

Yet another advantage of the present invention is to provide a system and a method for delivering media content based on a subscription which may provide a list of media content available for consuming with a terminal in a first location and/or in a second location based on a subscription of a user to a media provider.

A further advantage of the present invention is to provide a system and a method for delivering media content based on a subscription which may provide an EPG to indicate and/or to display a list of media content available for consumption based on a subscription of a user to a media provider.

Moreover, an advantage of the present invention is to provide a system and a method for delivering media content based on a subscription which may assign and may associate the subscription to a user without limiting access to the media content by a location of the user.

And, another advantage of the present invention is to provide a system and a method for delivering media content based on a subscription which may provide a storage device associated with a user for storing one or more multimedia files and/or a list of media content available based on the subscription of the user.

Yet another advantage of the present invention is to provide a system and a method for delivering media content based on a subscription which may store one or more multimedia files based on the subscription of a user in a storage device of the first user.

Another advantage of the present invention is to provide a system and a method for delivering media content based on a subscription which may provide a first EPG for a first user and a second EPG for a second user for accessing a multimedia file from a database of a media provider.

Yet another advantage of the present invention is to provide a system and a method for delivering media content based on a subscription which may allow a user to personalize and/or to customize an EPG for the user based on the subscription of the user to a media provider.

A still further advantage of the present invention is to provide a system and a method for delivering media content based on a subscription which may provide advertising media with a multimedia file to a terminal of a user based on a subscription of the user to a media provider.

Moreover, an advantage of the present invention is to provide a system and a method for delivering media content based on a subscription which may provide two or more terminals at a location for consuming the media content by two or more users based on a subscription of one of the users to a media provider.

And, another advantage of the present invention is to provide a system and a method for delivering media content based on a subscription which may access one or more multimedia files for consumption based on an attribute of one or more users and/or on a subscription of one of the users to a media provider.

Yet another advantage of the present invention is to provide a system and a method for delivering media content based on a subscription which may limit the media content accessible by a user based on the subscription of the user to a media provider.

Moreover, an advantage of the present invention is to provide a system and a method for delivering media content based on a subscription which may access a database of a media provider for consuming one or more multimedia files based on the subscription of a user to the media provider.

Additional features and advantages of the present invention are described in, and will be apparent from, the detailed description of the presently preferred embodiments and from the drawings.

DETAILED DESCRIPTION OF THE PREFERRED EMBODIMENTS

The present invention relates to a system and a method for delivering media content based on a subscription. The system and the method may provide the media content to a user via one or more terminals based on a subscription of the user to a media provider. The media provider may assign and/or may associate the subscription to the user to allow the user access to the media content from the media provider with one or more terminals at one or more locations based on the subscription of the user. The media provider may provide a list of media content available for consuming by the user based on the subscription of the user. The list of media content available may be displayed and/or may be accessed with an electronic programming guide (EPG) via one or more terminals at one or more locations. The user may locate and/or may select one or more multimedia files from the list of media content available on the EPG via a graphic user interface (hereinafter "GUI") and/or one or more terminals. As a result, the user may access, may consume and/or may experience one or more multimedia files based on the subscription of the user via one or more terminals at one or more locations. The user may store one or more multimedia files and/or the list of media content available in a storage device which may be local or may be remote with respect to the user.

Figure 1:
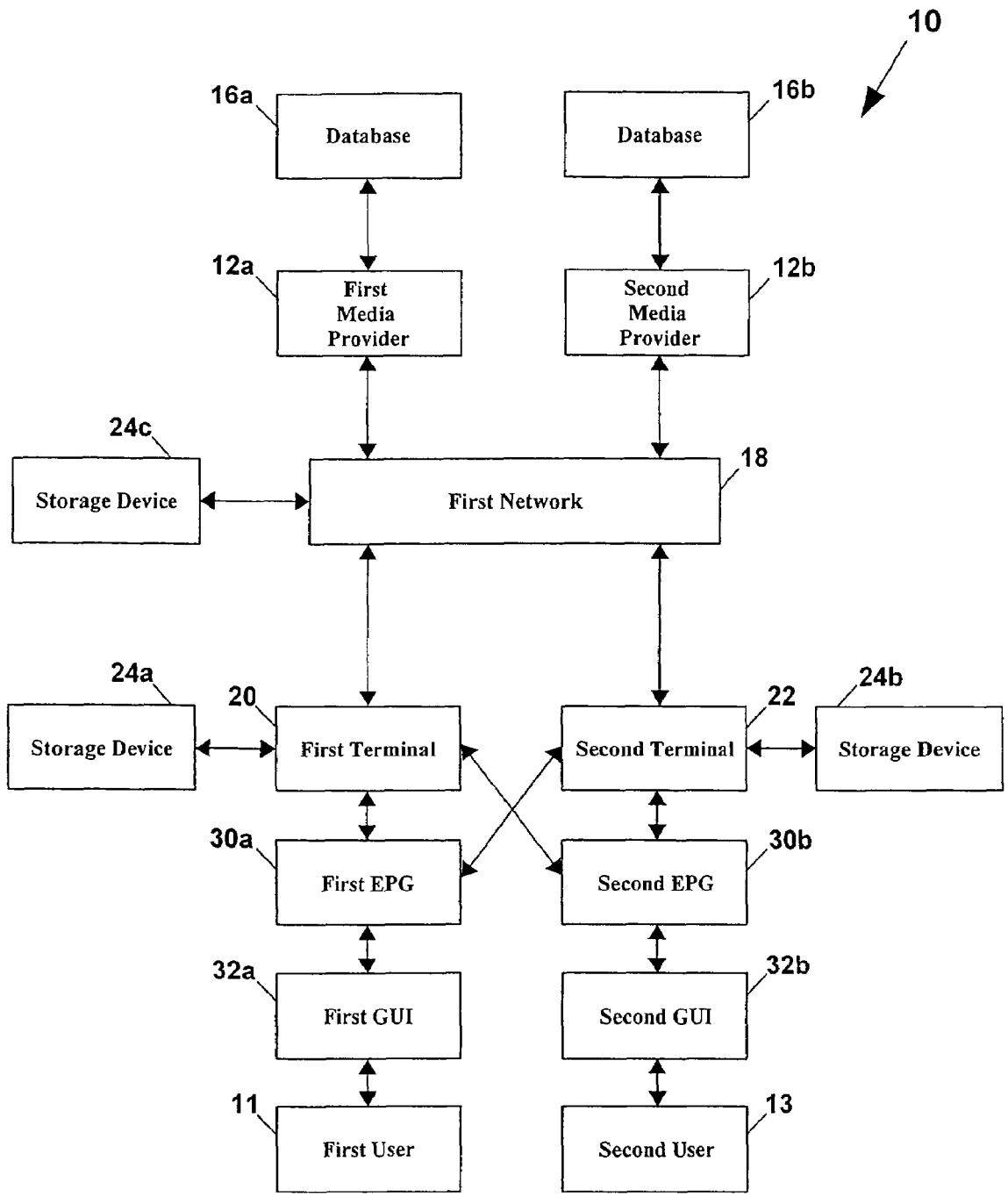
FIG. 1 illustrates a black box diagram of a system for delivering media content based on a subscription in an embodiment of the present invention.

Referring now to the drawings wherein like numerals refer to like parts, FIG. 1 generally illustrates a system 10 for providing and/or for delivering media content to a first user 11 and/or a second user 13. The system 10 may have a first media provider 12a for connecting a database 16a of the first media provider 12 to a first data communication network 18 (hereinafter "the first network 18"). Further, the system 10 may have a second media provider 12b for connecting a database 16b to the first network 18. The database 16a and/or the database 16b (collectively known hereinafter as "the databases 16a, 16b") may be connected to and/or may be in communication with the first media provider 12a and/or the second media provider 12b, respectively. A first terminal 20 and/or a second terminal 22 may be connected to and/or may be in communication with the first media provider 12a and/or the second media provider 12b (collectively known hereinafter as "the media providers 12a, 12b") via the first network 18. The first media provider 12a, the second media provider 12b, the first terminal 20 and/or the second terminal 22 may be remote or may be local with respect to each other. The databases 16a, 16b of the media provider 12a, 12b, respectively, may be accessible by the first terminal 20 and/or the second terminal 22 (collectively known hereinafter as "the terminals 20, 22") via the first network 18.

Electronic storage devices 24a, 24b (hereinafter "the storage devices 24a, 24b) may be connected to, may be accessible by and/or may be in communication with the first terminal 20 and/or the second terminal 22, respectively. The storage devices 24a, 24b may be remote with respect to the first terminal 20 and/or the second terminal 22, respectively. An electronic storage device 24c (hereinafter "the storage device 24c") may be connected to, may be accessible by and/or may be in communication with the first media provider 12a, the second media provider 12b, the first terminal 20 and/or the second terminal 22 via the network 18. The storage device 24c may be local and/or may be remote with respect to the first media provider 12a, the second media provider 12a, the first terminal 20 and/or the second terminal 22.

Figure 2:
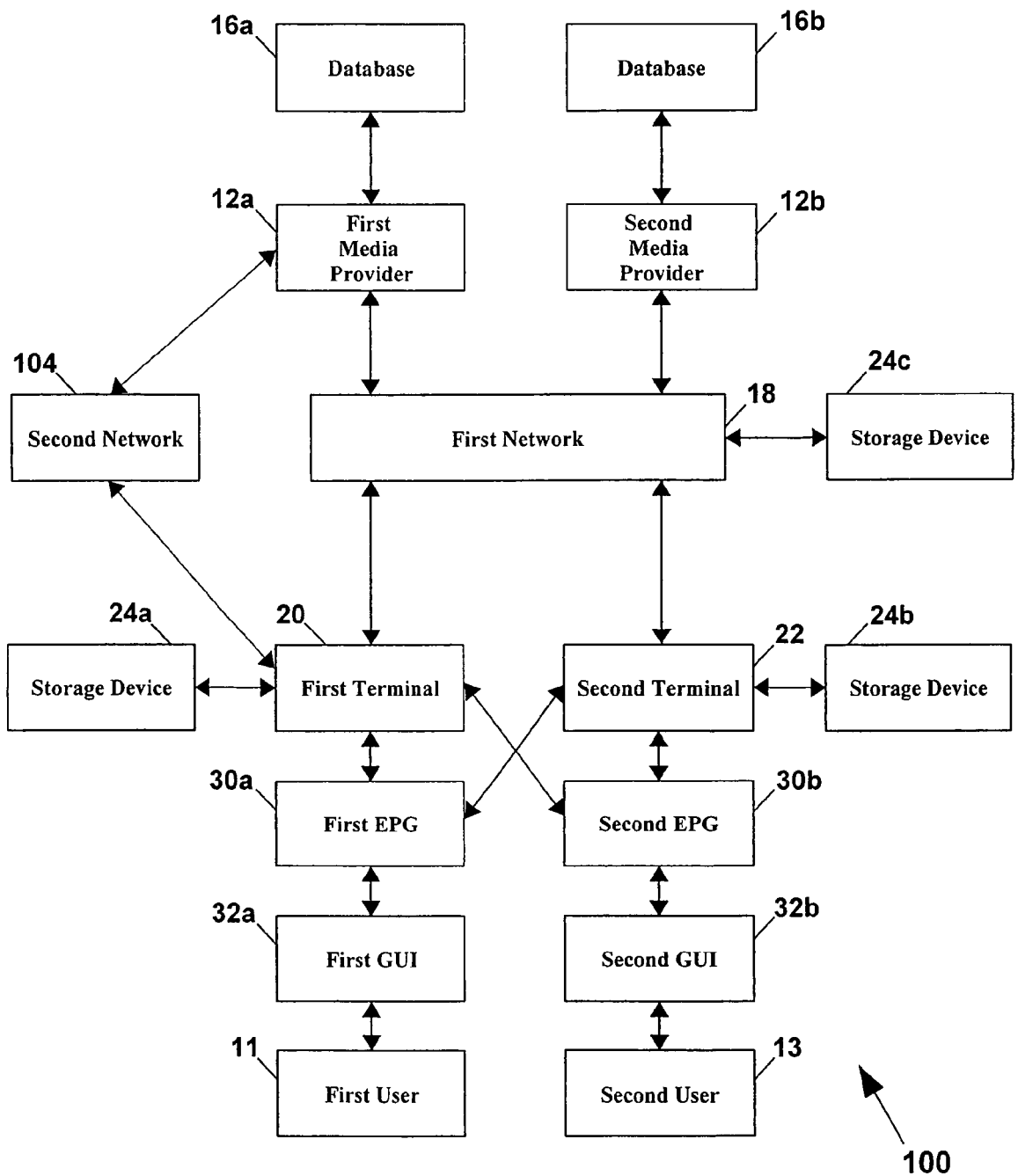
FIG. 2 illustrates a black box diagram of a system for delivering media content based on a subscription in an embodiment of the present invention.

FIG. 2 generally illustrates a system 100 for providing and/or for delivering the media content to the first user 11 and/or the second user 13. The system 100 may have the first terminal 20 and/or the second terminal 22 which may be connected to the media providers 12a, 12b via the first network 18. The databases 16a, 16b may be accessible by and/or may be connected to the media providers 12a, 12b, respectively. The storage device 24a may be accessible by and/or may be connected to the first terminal 20. The storage device 24b may be accessible by and/or may be connected to the second terminal 22. The storage device 24c may be accessible by and/or may be connected to the terminals 20, 22 and/or the media providers 12a, 12b via the first network 18.

The first terminal 20 may be connected to and/or may be in communication with the first media provider 12a via a second data communication network 104 (hereinafter "the second network 104"). The first terminal 20 may access, may be connected to and/or may be in communication with the database 16a of the first media provider 12 via the first network 18 and/or the second network 104. The first terminal 20 may access, may be connected to and/or may be in communication with the database 16b of the second media provider 12b via the first network 18. The second terminal 22 may access, may be connected to and/or may be in communication with the databases 16a, 16b of the media providers 12a, 12b, respectively, via the first network 18.

The media providers 12a, 12b may be, for example, a media station, a media content provider, a media content library, a media exchange provider and/or the like. The media station may be, for example, a television station, a radio station, a streamed radio source, a streamed video source, a satellite radio station and/or the like. The media content provider may be, for example, a cable television provider, a satellite television provider, a satellite radio provider, an internet radio provider, a streaming audio and/or video provider and/or the like. The media content library may be a media content retailer and/or a distributor such as, for example, a media store, a file-sharing store, an online media distributor and/or the like. It should be understood that the media providers 12a, 12b may be any source capable of transferring the media content to the terminals 20, 22.

The databases 16a, 16b may have, may contain and/or may store the media content and/or data. The media content may be a digital multimedia file (hereinafter "the multimedia file"), such as, for example, an audio signal, video frames, a data feed, a data stream, a musical composition, a radio program, an audio book, an audio program. Further, the multimedia file may be, for example, a cable television program, a satellite television program, a public access program, a motion picture, a music video, an animated work, a video program, a video game and/or a soundtrack and/or a video track of an audiovisual work, a dramatic work, a film score, an opera and/or the like. Further, the data may be based on, may correspond to and/or may be associated with the multimedia file. The databases 16a, 16b may contain and/or may store one or more multimedia files and/or any amount of data as known to one of ordinary skill in the art. The present invention should not be limited to a specific embodiment of the data and/or the multimedia file. It should be understood that the data and/or the multimedia file may be any data and/or any digital media file, respectively, as known to one of ordinary skill in the art.

Each multimedia file in the databases 16a, 16b may have metadata which may be, for example, a communication and/or information associated with, related to and/or corresponding to the multimedia file and/or the media providers 12a, 12b. The metadata may be formatted in a standard data format, such as, for example, XML, RDF, RSS, MathML, XHTML, SVG, cXML and/or the like. The communication may be, for example, text, a graphic, a voice recording, a video recording, a conferencing recording, a comment, a note, a review, a correspondence, a commentary, a message, a discussion, a notice, a bulletin, a memorandum, news and/or the like which may be related to, may be associated with and/or may be based on the multimedia file. The present invention should not be limited to a specific embodiment of the standard data format of the metadata and/or to a specific embodiment of the metadata and/or the communication.

The information of the metadata may be, for example, a name of the multimedia file, a type of the multimedia file and/or the like. The type of the multimedia file may be, for example, a musical composition, a radio program, an audio book, an audio program, a television program, a movie, a music video, an animated work, a video program, a video game and/or a soundtrack and/or a video track of an audiovisual work, a dramatic work, a film score and/or an opera and/or the like. Further, the information may be, for example, a year of the multimedia file, an artist associated with the multimedia file, a publisher or a copyright owner of the multimedia file, a genre associated with the multimedia file and/or a length of time of the multimedia file. Moreover, the information may be, for example, a content rating of the multimedia file, a language associated with the multimedia file, a key word associated with the multimedia file, a review of the multimedia file, a source of the multimedia file and/or the like. The present invention should not be limited to a specific embodiment of the communication and/or the information of the metadata.

The terminals 20, 22 may be, for example, a computer terminal, a mobile device, a set-top box, and/or an electronic device capable of consuming, of receiving, of processing, and/or of displaying the multimedia file and/or the metadata associated with the multimedia file. The set-top box may be connected to a display (not shown in the figures) for viewing, for consuming and/or for displaying the multimedia file and/or the metadata associated with the multimedia file. Alternatively, the set-top box may be, for example, a digital multimedia broadcasting-enabled television and/or the like. In an embodiment, the mobile device may be, for example, a 4G mobile device, a 3G mobile device, an internet protocol (hereinafter "IP") video cellular telephone, an ALL-IP electronic device, a PDA, a laptop computer, a mobile cellular telephone, a satellite radio receiver, a portable digital audio player, a portable digital video player and/or the like. It should be understood that the terminals 20, 22 may be any terminal capable of transmitting, capable of receiving, capable of processing, capable of consuming and/or capable of displaying the metadata and/or the multimedia file as known to one having ordinary skill in the art.

The first network 18 and/or the second network 104 (collectively known hereinafter as "the networks 18, 104") may be a fixed network, such as, for example, a cabled network, a permanent network and/or the like. In an embodiment, the networks 18, 104 may be a temporary network, such as, for example, a modem network, a null modem network and/or the like. In an embodiment, the networks 18, 104 may be, for example, a local area network, a metropolitan area network, a wide area network, a personal area network and/or the like.

Alternatively, the networks 18, 104 may be a wireless network, such as, for example, a wireless metropolitan area network, a wireless local area network, a wireless personal area network, a global standard network, a personal communication system network, a pager-based service network, a general packet radio service, a universal mobile telephone service network, a radio access network and/or the like. The present invention should not be limited to a specific embodiment of the networks 18, 104. It should be understood that the networks 18, 104 may be any network capable of delivering the multimedia file and/or media content to the terminals 20, 22 as known to one having ordinary skill in the art.

The media provider 12a, 12b may deliver, may distribute, may stream, may broadcast and/or may transmit the media content and/or the multimedia file to the terminals 20, 22 via the networks 18, 104. The media content and/or the multimedia file may be consumed by, may be displayed to, may be experienced by and/or may be reproduced to the first user 11 and/or the second user 13 via the terminals 20, 22. It should be understood that the media content and/or the multimedia file may be delivered to the terminals 20, 22 by any means of transmission over the networks 18, 102 as known to one having ordinary skill in the art.

The storage device 24a, the storage device 24b and/or the storage device 24c (collectively known hereinafter as "the storage devices 24a-24c") may be a data storage device, such as, for example, an online digital storage locker, a flash memory/memory card, a solid state semiconductor memory, a magnetic bubble memory, a disk storage, a database and/or the like. In an embodiment, the storage devices 24a-24c may be, for example, a digital video recorder, a personal video recorder, a hard disk recorder and/or the like. The storage devices 24a-24c may permanently or may temporally store the data, the media content and/or the multimedia file for consumption by the terminals 20, 22. It should be understood that the storage devices 24a-24c may be any storage media as known to one of ordinary skill in the art.

The terminals 20, 22 may have a guide application, such as, for example, an electronic program guide (EPG), an interactive program guide and/or the like. The guide application may search, may locate, may identify, may navigate and/or may select the multimedia file, the media content and/or the metadata stored in the databases 16a, 16b. The guide application may have a graphical user interface (hereinafter "GUI") for displaying media content information corresponding to and/or based on the multimedia files and/or the media content. The GUI may display the media content information in a display format, such as, for example, rows and/or columns. Further, the GUI may display the media content information in two dimensions or in three dimensions. Further, the GUI may be formatted in a standard data format, such as, for example, XML, RDF, RSS, MathML, XHTML, SVG, cXML and/or the like. It should be understood that the guide application, the display format of the GUI and/or the standard data format of the GUI may be any guide application, any display format and/or any standard data format, respectively, as known to one having ordinary skill in the art.

The first user 11 and/or the second user 13 may obtain, may acquire and/or may purchase subscriptions to the media content of the media providers 12a, 12b. In an embodiment, the first user 11 may obtain, may acquire and/or may purchase a first subscription from the media providers 12a, 12b to receive, to consume and/or to experience the media content and/or the multimedia file via the terminals 20, 22 and/or the networks 18, 104. The second user 13 may obtain, may acquire and may purchase a second subscription from the media providers 12a, 12b via the terminals 20, 22 and/or the networks 18, 104. The first subscription and/or the second subscription may be associated with, may be assigned to and/or may correspond to the first user 11 and/or the second user 13, respectively, for consuming the media content and/or the multimedia file from the media providers 12a, 12b. As a result, the terminals 20, 22 may access, may download and/or may consume the media content and/or the multimedia file from the databases 16a, 16b of the media providers 12a, 12b, respectively, via the networks 18, 104.

The multimedia file may contain advertising media which may relate to, may be associated with and/or may correspond to the media providers 12a and/or 12b. The advertising media may be, for example, a commercial, an advertisement, an audio transmission, a video, an interview, a commentary, a documentary and/or the like. In an embodiment, the advertising media may relate to, may be associated with and/or may correspond to an entity, such as, for example, a corporate entity, a marketing agency, a media distributor, a consumer products producer, an advertising agency, a manufacturer, a government agency, a travel corporation, an entertainment corporation and/or the like. The present invention should not be limited to a specific embodiment of the entity associated with the advertising media. It should be understood that the advertising media may be any type of media as known to one of ordinary skill in the art.

The media providers 12a, 12b may transmit, may deliver and/or may send a first EPG 30a to the first terminal 20 of the first user 11 based on the first subscription of the first user 11. The first EPG 30a may be delivered to the first terminal 20 via the first network 18 as illustrated in FIG. 1 or via the networks 18, 104 as illustrated in FIG. 2. In an embodiment, the first EPG 30a may be delivered to the first user 11 via the second terminal 22 and/or the first network 18 as shown in FIGS. 1 and 2. The media providers 12a, 12b may transmit, may deliver and/or may send a second EPG 30b to the second terminal 22 based on the second subscription of the second user 13. The second EPG 30b may be delivered to the second terminal 22 via the first network 18 and/or to the first terminal 20 via the networks 18, 104. As a result, the second EPG 30b may be delivered to the second user 13 via the terminals 20, 22 and/or the networks 18, 104.

The first EPG 30a and/or the second EPG 30b may correspond to, may be associated with, may be based on and/or may be assigned to the first subscription of the first user 11 and/or the second subscription of the second user 13, respectively. The first EPG 30a may display and/or may indicate a first list of media content available for consumption by the first user 11 based on the first subscription of the first user 11 to the media providers 12a, 12b. The second EPG 30b may display and/or may indicate a second list of media content available for consumption by the second user 13 based on the second subscription of the second user 13 to the media providers 12a, 12b. The first user 11 and/or the second user 13 may access, may select and/or may consume the media content and/or the multimedia file from the media providers 12a, 12b via the first EPG 30a and/or the second EPG 30b, respectively.

For example, the first subscription of the first user 11 may allow the first user 11 to access and/or to consume the media content and/or the multimedia file for one or more sporting events. The first user 11 may access and/or may display the first list of media content available for consumption by the first user 11 based on the first subscription of the first user 11 via the first EPG 30a. The first list of media content available may be based on the first subscription of the first user 11 for accessing and/or for consuming one or more sporting events to the first user 11 via the first EPG 30a and/or the terminals 20, 22. The first list of media content available may display the media content information and/or the metadata associated with and/or corresponding to one or more sporting events which may be consumed by the first user 11 based on the first subscription of the first user 11. The first list of media content available may display, for example, a time and/or a duration associated with the multimedia file which may be available for consumption by the first user 11 via the first EPG 30a and/or the terminals 20, 22.

The first user 11 and/or the second user 13 may personalize, may modify and/or may customize an appearance of the first EPG 30a and/or of the second EPG 30b, respectively, for displaying the media content available for consumption by the first user 11 and/or by the second user 13, respectively. The first list of media content available and/or the second list of media content available may contain and/or may display media content information and/or the metadata relating to the media content and/or the multimedia file available for consumption by the first user 11 and/or by the second user 13. The appearance of the first EPG 30a and/or the second EPG 30b may be related to and/or may be associated with a display element of the first EPG 30a and/or of the second EPG 30b, respectively. The display element of the appearance may be, for example, a format, a language, a color, an orientation, a visual aspect and/or the like. The present invention should not be deemed as limited to a specific embodiment of the display element of the appearance of the first EPG 30a and/or of the second EPG 30b.

The media content and/or the multimedia file which may be contained within the first list of media content available and/or in the second list of media content available may be highlighted and/or may be identified by the first user 11 and/or by the second user 13, respectively. The first user 11 and/or the second user 13 may highlight and/or may identify the media content and/or the multimedia based on an interest and/or an attribute of the first user 11 and/or the second user 13, respectively, via the first EPG 30a and/or the second EPG 30b, respectively. The interest and/or the attribute of the first user 11 and/or of the second user 13 may relate to and/or may be associated with, for example, biographical information, a personal preference, a cultural interest, religious affiliation, an educational level, a geographical location, a family orientation, a period of time, a community value, an age group and/or the like. The interest and/or the attribute of the first user 11 and/or of the second user 13 may be associated with, may be based on and/or may be indicative of the first user 11 and/or the second user 13. As a result, the media content and/or the multimedia file may be highlighted and/or may be identified from the first list of media content available and/or the second list of media content available based on the interest and/or the attribute of the first user 11 and/or the second user 13, respectively. The present invention should not be deemed as limited to a specific embodiment of the interest and/or attribute of the first user 11 and/or the second user 13.

A first GUI 32a may be associated with the first EPG 30a for accessing and/or for manipulating the first list of media content available to select the media content and/or the multimedia file for consuming by the first user 11. A second GUI 32b may be associated with the second EPG 30b for accessing and/or for manipulating the second list of media content available to select the media content and/or the multimedia file for consuming by the second user 13 via the terminals 20, 22. The first GUI 32a and/or the second GUI 32b (collectively known hereinafter as "the GUIs 32a, 32b") may correspond to the first subscription of the first user 11 and/or the second subscription of the second user 13, respectively. The first user 11 and/or the second user 13 may select the multimedia file from the first list of media content available and/or the second list of media content available, respectively, via the first GUI 32a of the first EPG 30a and/or the second GUI 32b of the second EPG 30b, respectively.

The first user 11 and/or the second user 13 may request and/or may signal the media providers 12a, 12b to transfer and/or to transmit the multimedia file to the terminals 20, 22, respectively, via the first GUI 32a and/or the second GUI 32b, respectively. The media providers 12a, 12b may transfer the multimedia file from the database 16a, 16b to the terminals 20, 22 based on the first subscription of the first user 11 and/or the second subscription of the second user 13. The media providers 12a, 12b may transfer the multimedia file to the terminals 20, 22 as requested by the first user 11 and/or the second user 13. The terminals 20, 22 may receive and/or may display the multimedia file for consuming the multimedia file by the first user 11 and/or the second user 13 via the networks 18, 104. The multimedia file from the first list of media content available may be consumed by and/or may be experienced by the first user 11 via the first EPG 30a, the first GUI 32a and/or the terminals 20, 22. The multimedia file from the second list of media content available may be consumed by and/or may be experienced by the second user 13 via the second EPG 30b, the second GUI 32b and/or the terminals 20, 22. The advertising media may be displayed to, may be consumed by and/or may be experienced by the first user 11 and/or the second user 13 prior to, during and/or after consumption of the multimedia file via the terminals 20, 22.

The multimedia file and/or the first list of media content available may be stored in the storage device 24a via the terminals 20, 22 by the first user 11. The first subscription of the first user 11 may permit the multimedia file and/or the first list of media content available to be stored in the storage device 24a. As a result, the first user 11 may access, may consume and/or may experience the multimedia file and/or the first list of media content available stored in the storage device 24a based on the first subscription of the first user 11 via the terminals 20, 22.

The multimedia file and/or the second list of media content available may be stored in the storage device 24b via the terminals 20, 22 by the second user 13. The second subscription of the second user 13 may permit the multimedia file and/or the second list of media content available to be stored in the storage device 24b. As a result, the second user 13 may access, may consume and/or may experience the multimedia file and/or the second list of media content available stored in the storage device 24b based on the second subscription of the second user 13 via the terminals 20, 22.

The multimedia file, the first list of media content available and/or the second list of media content available may be stored in the storage device 24c via the terminals 20, 22 by the first user 11 and/or by the second user 13. The first subscription of the first user 11 and/or the second subscription of the second user 13 may permit the multimedia file or the first list of media content available and/or the second list of media content available to be stored in the storage device 24c via the terminals 20, 22 and/or the networks 18, 204. As a result, the first user 11 and/or the second user 13 may access, may consume and/or may experience the multimedia file, the first list of media content available and/or the second list of media content available stored in the storage device 24c via the terminals 20, 22 and/or the networks 18, 104.

In an embodiment, the first user 11 may have the first subscription to the first media providers 12a, 12b for consuming the multimedia file associated with, for example, one or more motion pictures. The first user 11 may desire to consume and/or to experience the multimedia file based on the first subscription with the second user 13 via the second terminal 22 of the second user 13 at a location remote with respect to the first terminal 20. The first user 11 may access and/or may display the first list of media content available with the first EPG 30a via the second terminal 22 of the second user 13. The first user 11 may manipulate and/or may select the multimedia file from the first list of media content available and/or the first EPG 20a with the first GUI 32a on the second terminal 22.

The second terminal 22 may request the multimedia file selected from the first list of media content available by the first user 11 to be delivered to the second terminal 22 from the databases 16a, 16b of the media providers 12a, 12b, respectively, via the first network 18. Alternatively, the second terminal 22 may request delivery of the multimedia file from the storage device 24a and/or the storage device 24c via the networks 18, 104. The multimedia file may be delivered from the media providers 12a, 12b, from the storage device 24a and/or from the storage device 24c to the second terminal 22 via the networks 18, 104. The second terminal 22 may display and/or may render the multimedia file to the first user 11 and/or the second user 13. As a result, the first user 11 may consume and/or may experience the multimedia file with the second user 13 via the second terminal 22 based on the first subscription of the first user 11.

In an embodiment, the second user 13 may desire to consume and/or to experience the media content of the providers 12a, 12b with the first user 11 via the first terminal 20 of the first user 11. The second user 13 may obtain, may purchase and/or may acquire the second subscription to the first provider 12a and/or the second provider 12b to consume the multimedia file from the providers 12a, 12b based on the second subscription of the second user 13. The second user 13 may access the second EPG 30b with the first terminal 20 via the networks 18, 104 based on the second subscription of the second user 13. The second user 13 may access, may manipulate and/or may display the second list of media content available for consumption by the second user 13 via the second GUI 32b, the second EPG 30b and/or the first terminal 20 based on the second subscription of the second user 13.

The first terminal 20 may request the multimedia file selected from the second list of media content available to the second user 13 for delivery to the first terminal 20 from the databases 16a, 16b of the media providers 12a, 12b, respectively, via the networks 18, 104. Alternatively, the first terminal 20 may request delivery of the multimedia file from the storage device 24b and/or the storage device 24c via the networks 18, 104. The multimedia file may be delivered from the media providers 12a, 12b, from the storage device 24a and/or from the storage device 24c to the first terminal 20 via the networks 18, 104. The first terminal 20 may display and/or may render the multimedia file to the first user 11 and/or the second user 13 (collectively known hereinafter as "the users 11, 13"). As a result, the first user 11 may consume and/or may experience the multimedia file with the second user 13 via the first terminal 20 based on the second subscription of the first user 13.

In an embodiment, the first terminal 20 may display and/or may render the multimedia file from the providers 12a, 12b to the first user 11 and/or the second user 13 based on the first subscription of the first user 11. As a result, the first user 11 may consume and/or may experience the multimedia file with the second user 13 based on the first subscription of the first user 11 via the first terminal 20. Alternatively, the second terminal 22 may display and/or may render the multimedia file from the providers 12a, 12b to the users 11, 13 based on the second subscription of the second user 13. As a result, the second user 13 may consume and/or may experience the multimedia file with the first user 11 based on the second subscription of the second user 13 via the second terminal 22.

In an embodiment, the terminals 20, 22 may be referred to as primary terminals of the system 10 and/or the system 100 for consuming the media content of the media providers 12a, 12b. The system 10 and/or the system 100 may have secondary terminals (not shown in the figures) for displaying, for consuming and/or for rendering the media content of the media providers 12a, 12b to a third user (not shown in the figures), the first user 11 and/or the second user 13. The second terminals may be local with respect to, may be connected to and/or may be in communication with the primary terminals for displaying and/or for rendering the multimedia file to the third user. The third user may be associated with and/or may relate to the users 11, 13. The third user may be, for example, a family member, a classmate, an associate and/or an affiliate with respect to the users 11, 13. The present invention should not be deemed as limited to a specific embodiment of the third user.

The first subscription of the first user 11 and/or the second subscription of the second user 13 may permit the third user to access and/or to select the multimedia file of the providers 12a, 12b via one or more of the secondary terminals and/or the networks 18, 104. The secondary terminals may display and/or may render the multimedia file to the users 11, 13 and/or the third user based on the first subscription of the first user 11 and/or the second subscription of the second user 13. As a result, the third user may consume and/or may experience the multimedia file via one or more of the secondary terminals based on the first subscription of the first user 11 and/or the second subscription of the second user 13. Alternatively, the users 11, 13 may consume and/or may experience the multimedia file via one or more of the secondary devices based on the first subscription of the first user 11 and/or the second subscription of the second user 13, respectively. The third user may consume and/or may experience the multimedia file with the users 11, 13 via the terminals 20, 22 and/or one or more of the secondary terminals.

The first subscription of the first user 11 and/or the second subscription of the second user 13 may be indicative of a number of secondary terminals and/or an attribute of the third user. The attribute of the third user may relate to and/or may be associated with, for example, biographical information, a personal preference, a cultural interest, a religious affiliation, an educational level, a geographical location, a family orientation, a period of time, a community value and/or an age group of the third user. It should be understood that the attribute of the third user may be any attribute as known to one of ordinary skill in the art.

In an embodiment, the first subscription of the first user 11 may be indicative of and/or may be based on the first terminal 20 and/or a first number of the secondary terminals. The first number of the secondary terminals may be, for example, three or four. As a result, the first terminal 20 and/or the secondary terminals of the first terminal 20 may access, may display and/or may consume the media content and/or the multimedia file of the media providers 12a, 12b via the networks 18, 104, the storage device 24a and/or the storage device 24c. In an embodiment, the second subscription of the second user may be indicative of and/or may be based on the second terminal 22 and a second number of the secondary terminals. The second number of the second terminals may be, for example, one or two. As a result, the second terminal 22 and/or the secondary terminals of the second terminal 22 may access, may display and/or may consume the media content and/or the multimedia file of the media providers 12a, 12b via the first network 18, the storage device 24b and/or the storage device 24c.

A monetary cost of the first subscription of the first user 11 and/or of the second subscription of the second user 13 may be discounted and/or may be increased based on the number of secondary terminals which may be used to access, to display and/or to consume the media content and/or the multimedia file from the providers 12a, 12b. For example, the monetary cost of the first subscription of the first user 11 with the first number of the secondary terminals may be discounted by twenty (20) U.S. dollars. Alternatively, the monetary cost of the second subscription of the second user 13 with the second number of secondary terminals may be increased forty (40) U.S. dollars.

In an embodiment, the first subscription of the first user 11 may be indicative of and/or may be based on the attribute of the third user, such as, for example, that an age of the third user is greater than sixty-five (65) years old or less than five (5) years old. The monetary cost of the first subscription may be based on and/or may be associated with the attribute of the third user. For example, the monetary cost of the first subscription of the first user 11 may be discounted or may be increased by ten (10) U.S. dollars based on the age of the third user. The third user may be restricted and/or may be prevented from accessing, from displaying and/or from consuming the multimedia file from the providers 12a, 12b based on the attribute of the third user, on the first subscription of the first user 11 and/or on the second subscription of the second user 13.

The systems 10, 100 may provide the media content to the users 11, 14 via the terminals 20, 22 based on the subscriptions of the users 11, 13. The media providers 12a, 12b may assign and/or may associate the subscriptions of the users 11, 13 for accessing the multimedia file from the media providers 12a, 12b with the terminals 20, 22 at one or more locations. The media providers 12a, 12b may provide a first list of media content available and/or a second list of media content available for consuming by the users 11, 13, respectively, based on the subscriptions of the users 11, 13, respectively. The lists of media content available may be displayed and/or may be accessed with the EPGs 30a, 30b via the terminals 20, 22 at one or more locations. The users 11, 13 may locate and/or may select one or more multimedia files from the lists of media content available on the EPGs 30a, 30b via the GUI 32a, 32b and/or the terminals 20, 22. As a result, the users 11, 13 may access, may consume and/or may experience one or more multimedia files based on the subscriptions of the users 11, 13 via the terminals 11, 13 at one or more locations. The users 11, 13 may store one or more multimedia files and/or the lists of media content available in the storage devices 24a-24c which may be local or may be remote with respect to the users 11, 13.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A system for transmitting multimedia wherein a first user has a first subscription and a second user has a second subscription, the system comprising:

a first database connected to a first media provider wherein a first plurality of multimedia files is stored within the first database;

a first electronic program guide that lists at least one multimedia file of the first plurality of multimedia files wherein the first electronic program guide corresponds to the first subscription of the first user;

a second database connected to a second media provider wherein a second plurality of multimedia files is stored within the second database;

a first network connected to the first media provider and the second media provider;

a first terminal associated with the first media provider and connected to the first network wherein the first media provider identifies the first subscription of the first user to allow the first user to use the first terminal to access the first electronic program guide via the first network wherein the first terminal displays the first electronic program guide to the first user wherein the first user selects a first multimedia file of the first plurality of multimedia files from the first electronic program guide so that the first multimedia file is transmitted to the first terminal;

a second terminal associated with the second media provider and connected to the first network wherein the first media provider identifies the first subscription of the first user to allow the first user to use the second terminal to access the first electronic program guide wherein the second terminal displays the first electronic program guide to the first user wherein the first user selects a second multimedia file of the first plurality of multimedia files from the first electronic program guide so that the second multimedia file is transmitted to the second terminal; and a storage device connected to the first network wherein the storage device is associated with the first user by the first subscription of the first user wherein the first multimedia file transmitted to the first terminal and the second multimedia file transmitted to the second terminal is stored in the storage device and accessed by the first user based on the first subscription of the first user.

2. The system of claim 1 further comprising:
a second electronic program guide associated with the second plurality of multimedia files wherein the second user uses the first terminal to access the second electronic program guide via the first network based on the second subscription.

3. The system of claim 1 further comprising:
a second network connected to the first terminal and the first media provider wherein the first terminal accesses the first database via the second network and the first media provider.

4. The system of claim 1 further comprising:
a second database connected to a second media provider wherein a second plurality of media files is stored within the second database.

5. The system of claim 1 further comprising:
a graphic user interface wherein the graphic user interface displays the first electronic program guide and allows the first user to select one or more of the plurality of multimedia files available on the electronic programming guide so that one or more of the plurality of multimedia files are transmitted to the first user via the first network.

6. The system of claim 1 wherein the second terminal is located remotely with respect to the first terminal.

7. The system of claim 1 wherein the first electronic program guide displays a time and a duration associated with each one of the plurality of multimedia files that are displayed.

8. The system of claim 1 wherein the first electronic program guide displays multimedia files that correspond to an interest of the user.

9. The system of claim 1 wherein the first user uses the second terminal to access the storage device via the first network based on the first subscription.

10. The system of claim 1 further comprising:
a third terminal connected to the first terminal wherein a third user accesses the first electronic program guide via the third terminal based on the first subscription of the first user.

11. The method of claim 1 further comprising the step of:
storing the multimedia file in a storage device connected to the network.

12. A method for transmitting multimedia to a first user having a first subscription and a second user having a second subscription, the method comprising the steps of:
connecting a first media provider to a first network wherein the first media provider has a first database of multimedia files;
connecting a second media provider to a first network wherein the second media provider has a second database of multimedia files;
connecting a first terminal to the first network wherein the first terminal is associated with the first subscription;
connecting a second terminal to the first network wherein the second terminal is associated with the second subscription;
connecting a storage device to the first network;
providing the first user access to the first database from the first terminal via the first network based on the first subscription of the first user;
transmitting a first multimedia file from the first database to the first user at the first terminal based on the first subscription;
providing the first user access to the first database from the second terminal via the first network based on the first subscription of the first user;
transmitting a second multimedia file from the first database to the first user at the second terminal based on the first subscription; and
storing the second multimedia file in the storage device.

13. The method of claim 12 further comprising the step of:
providing the first user access to an electronic program guide that lists the multimedia files and allows the first user to select the first multimedia file.

14. The method of claim 12 further comprising the step of:
displaying an electronic program guide that lists multimedia files that correspond to an interest of the first user.

15. The method of claim 12 further comprising the step of:
connecting a second network to the first terminal wherein the first database is accessible from the first media provider via the second communication network.

16. The method of claim 12 further comprising the step of:
storing the first multimedia file in the storage device wherein the first multimedia file is accessible by the first user at the second terminal based on the first subscription.

17. The method of claim 12 further comprising the step of:
accessing the second database from the first terminal via the first network based on the second subscription of the second user.

18. A method for transmitting multimedia to a user having a subscription, the method comprising the steps of:
connecting a first media provider to a network wherein the first media provider has a first database of multimedia files;

connecting a first terminal and a second terminal to the first network wherein the first terminal is associated with the first subscription and the second terminal is associated with the second subscription;

generating a request by the second terminal for a multimedia file content list to be transmitted from the first media provider wherein the request has information about the first subscription of the first user wherein the multimedia file content list is multimedia files accessible by the user under the subscription;

transmitting an electronic program guide to the first user at the second terminal via the network wherein the electronic program guide includes the multimedia file content list wherein the electronic program guide is based on the first subscription of the user; and transmitting at least one of the multimedia files from the first database to the second terminal wherein the first media provider delivers the multimedia file via the network to the user for use on the second terminal wherein the multimedia file is selected by the user from the multimedia file content list.

19. The method of claim 18 further comprising the step of: the electronic program guide displaying multimedia files that correspond to a preference of the user.

20. The method of claim 18 further comprising the step of: displaying a graphic user interface that displays the electronic program guide and allows the user to select the multimedia file from the multimedia file content list.

* * * * *